US011873537B2

(12) United States Patent
Hoesl et al.

(10) Patent No.: US 11,873,537 B2
(45) Date of Patent: Jan. 16, 2024

(54) METHOD FOR PRODUCING A PROFILED COMPONENT, AND PROFILED COMPONENT

(71) Applicant: Bayerische Motoren Werke Aktiengesellschaft, Munich (DE)

(72) Inventors: Thomas Hoesl, Salching (DE); Ulrich Schmid, Munich (DE); Markus Wierer, Au am Inn (DE); Siegfried Georg Zehentbauer, Geisenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 214 days.

(21) Appl. No.: 16/905,323

(22) Filed: Jun. 18, 2020

(65) Prior Publication Data
US 2020/0318211 A1    Oct. 8, 2020

Related U.S. Application Data

(63) Continuation of application No. PCT/EP2018/082210, filed on Nov. 22, 2018.

(30) Foreign Application Priority Data

Dec. 20, 2017    (DE) .................. 10 2017 223 374.5

(51) Int. Cl.
*C21D 9/08*        (2006.01)
*B32B 1/08*        (2006.01)
(Continued)

(52) U.S. Cl.
CPC .................. *C21D 9/08* (2013.01); *B32B 1/08* (2013.01); *B32B 15/013* (2013.01); *C21D 1/613* (2013.01);
(Continued)

(58) Field of Classification Search
CPC . C21D 9/08; C21D 1/673; C21D 8/10; C21D 2221/00; B32B 1/08; B32B 2597/00; B21D 22/025; B21D 26/033
See application file for complete search history.

(56) References Cited

U.S. PATENT DOCUMENTS 6,261,392 B1 *  7/2001  Sundgren ............... C21D 1/673
                                             148/590
10,443,109 B2  10/2019  Gomez
(Continued)

FOREIGN PATENT DOCUMENTS

CN    105935728 A    9/2016
CN    106180345 A   12/2016
(Continued)

OTHER PUBLICATIONS

K. Mori et al., Hot Stamping of ultra-high strength steel parts, Jun. 16, 2017, Elsevier, CIRP Annals-Manufacturing Technology 66, pp. 755-777 (Year: 2017).*
(Continued)

*Primary Examiner* — Nicholas A Wang
*Assistant Examiner* — Maxwell Xavier Duffy
(74) *Attorney, Agent, or Firm* — Crowell & Moring LLP

(57) ABSTRACT

A method for producing a component may include one or more of the following: providing and/or producing a profiled structural part, the structural part including a predetermined profile along its length; heat treating the profiled structural part; and press hardening the profiled structural part in a press-hardening tool. The profiled structural part in the press-hardening tool may be cooled in an interior thereof by circulating air, where during cooling of the profiled structural part in the press-hardening tool, different material properties are specifically set in at least two regions of the profiled structural part.

13 Claims, 3 Drawing Sheets

(51) Int. Cl.
  *B32B 15/01* (2006.01)
  *C21D 1/613* (2006.01)
  *C21D 1/673* (2006.01)
  *C21D 8/10* (2006.01)
(52) U.S. Cl.
  CPC ............... *C21D 1/673* (2013.01); *C21D 8/10* (2013.01); *B32B 2597/00* (2013.01); *C21D 2221/00* (2013.01)

(56) References Cited

U.S. PATENT DOCUMENTS

| | | |
|---|---|---|
| 2015/0075246 A1 | 3/2015 | Doerr et al. |
| 2016/0258035 A1 | 9/2016 | Gomez |
| 2017/0095854 A1 | 4/2017 | Ishizuka et al. |
| 2019/0161819 A1 | 5/2019 | Werbs |

FOREIGN PATENT DOCUMENTS

| | | |
|---|---|---|
| CN | 106660103 A | 5/2017 |
| CN | 107000018 A | 8/2017 |
| CN | 107626767 A | 1/2018 |
| DE | 10 2007 018 395 A1 | 10/2008 |
| DE | 20 2008 016 877 U1 | 3/2009 |
| DE | 10 2007 062 233 A1 | 6/2009 |
| DE | 10 2009 030 776 A1 | 12/2010 |
| DE | 10 2010 050 248 A1 | 5/2012 |
| DE | 10 2009 040 935 B4 | 3/2013 |
| DE | 10 2012 012 518 A1 | 12/2013 |
| DE | 10 2014 108 901 B3 | 10/2015 |
| DE | 10 2015 103 307 A1 | 9/2016 |
| DE | 10 2016 107 950 A1 | 10/2017 |
| DE | 10 2016 107 952 A1 | 11/2017 |
| EP | 1 342 515 A1 | 9/2003 |
| EP | 2 851 138 A1 | 3/2015 |
| EP | 3 159 071 A1 | 4/2017 |
| GB | 2505048 A | 2/2014 |
| WO | WO 2017/186220 A1 | 11/2017 |

OTHER PUBLICATIONS

L. H. Lang et al., Hydroforming highlights: sheet hydroforming and tube hydroforming, Sep. 1, 2004 Elsevier, Journal of materials Processing Technology 151, pp. 165-177 (Year: 2004).*

English translation of Chinese Office Action issued in Chinese Application No. 201880066094.9 dated Oct. 13, 2021 (eight (8) pages).

International Search Report (PCT/ISA/210) issued in PCT Application No. PCT/EP2018/082210 dated Jan. 24, 2019 with English translation (six pages).

German-language Written Opinion (PCT/ISA/237) issued in PCT Application No. PCT/EP2018/082210 dated Jan. 24, 2019 (seven pages).

German-language Search Report issued in German Application No. 10 2017 223 374.5 dated Aug. 30, 2018 with partial English translation (11 pages).

Chinese-language Office Action issued in Chinese Application No. 201880066094.9 dated Apr. 9, 2021 with English translation (11 pages).

* cited by examiner

METHOD FOR PRODUCING A PROFILED COMPONENT, AND PROFILED COMPONENT

CROSS REFERENCE TO RELATED APPLICATIONS

This application is a continuation of PCT International Application No. PCT/EP2018/082210, filed Nov. 22, 2018, which claims priority under 35 U.S.C. § 119 from German Patent Application No. 10 2017 223 374.5, filed Dec. 20, 2017, the entire disclosures of which are herein expressly incorporated by reference.

BACKGROUND AND SUMMARY OF THE INVENTION

A method for producing a profiled component is provided. A profiled component produced by the method is also provided. The profiled component may be for example a component of a vehicle body.

The term "press hardening" describes a hot sheet-metal forming process that is used for example for producing super-high-strength body components.

This method combines both the shaping and the heat treatment of the sheet-metal component in one process step—the so-called press hardening or pressure-controlled hardening. The method is characterized in that the sheet blanks or closed profiles that have been heated above the austenitizing temperature are introduced into a cold forming tool and subsequently quenched.

This heat treatment integrated within the forming creates a martensitic microstructure, so that the press-hardened components have very high tensile strengths, for example of up to 1800 MPa. Such components can be used as crash-related structural components, such as for example A pillar and B pillar reinforcement, bumpers or doorsills, and also in the drive train, for example as camshafts.

The document DE 10 2009 030 776 A1 describes a profiled component of a higher-strength sheet material, which has in the cross section of the profile at least two profile portions that are kept at a distance from one another and are substantially closed and are connected by way of a connecting portion of a flat form. It is in this case provided that such a connecting portion incorporates a notching, by the design of which the local profile width of the profiled component is set.

The document EP 1 342 515 A1 describes a method for producing a profiled component in which a tubular body is produced by means of a hydroforming process and is subsequently heated and hardened by means of a pressing tool.

A disadvantage of the methods known in the prior art is that the profiled components in the press-hardening tool are usually only cooled from the outside, by direct and/or indirect cooling, it only being inadequately possible for the cooling of the profiled component to be controlled.

Consequently, an object, at least of some of the embodiments, to be achieved is to provide a method for producing a profiled component in which specific cooling of the profiled component in the press-hardening tool is made possible. A further object is to provide a profiled component.

These objects are achieved by a method and a component according to the independent patent claims. Advantageous embodiments and developments also emerge from the dependent patent claims, the following description and from the drawings.

In the method described here for producing a profiled component, according to at least one embodiment, a profiled structural part is provided or produced. Preferably, the profiled structural part has at least one closed profile portion. The closed profile portion encloses a cavity and has in cross section, i.e. in particular perpendicularly to the longitudinal direction of the profile of the profiled structural part, a completely closed circumferential line. For example, the profiled structural part may be formed from a tubular body or from a tube.

The profiled structural part is also heat-treated. In the heat treatment, the profiled structural part may, for example, be heated in a furnace. Preferably, the profiled structural part is heated to a temperature of between 850° C. and 907° C. or is austenitized.

After the heat treatment, the profiled structural part is press-hardened in a press-hardening tool, which preferably comprises at least two tool parts. In this case, the profiled structural part in the press-hardening tool is cooled in its interior by circulating air or ambient air. In particular in the cavity that is enclosed by the closed profile portion, the circulating air or ambient air may contribute to a cooling of the profiled structural part by contact with the surface of the profiled structural part in the interior of the profiled structural part.

The fact that the profiled structural part arranged in the press-hardening tool is cooled in its interior by circulating air or ambient air means that it is not necessary to direct liquids and/or industrial gases, such as for example nitrogen, into the interior of the profiled structural part, so that complex maintenance and attachment to the press-hardening tool can be avoided.

According to a further embodiment, ambient air is directed into the interior of the profiled structural part as circulating air. The ambient air directed into the interior of the profiled structural part may for example have a temperature of between 10° C. and 30° C., preferably between 15° C. and 25° C., particularly preferably between 18° C. and 20° C. Furthermore, circulating air may get into the inner cavity by way of a stream of compressed air directed into the interior of the profiled structural part.

According to a further embodiment, the profiled structural part arranged in the press-hardening tool is also cooled by direct and/or indirect cooling from the outside. The term "from the outside" is used here to refer to a cooling of the surface of the profiled structural part that is facing away from the cavity. In the case of direct cooling, a cooling medium is brought into direct contact with the surface of the profiled structural part. In the case of indirect cooling, for example, a tool part or a number of tool parts of the press-hardening tool may be cooled by a cooling medium, so that the tool parts in contact with the outer surface of the profiled structural part cool the outer surface. For example, at least one tool part of the press-hardening tool may have one or more cooling channels for directing a cooling medium, such as for example water. Furthermore, a number of tool parts or all of the tool parts of the press-hardening tool may have one or more cooling channels.

According to a further embodiment, during the press hardening of the profiled structural part in the press-hardening tool, different material properties are specifically set in at least two regions of the profiled structural part. For example, different strengths or different hardnesses or different ductilities may be specifically set in at least two regions of the profiled structural part.

For example, the specific setting of the different material properties may be achieved by a defined control of the operation of closing the press-hardening tool. This may take place in particular without intervening in the temperature control of the press-hardening tool. For example, the defined control of the closing operation may take place by way of a defined speed of the press closing operation.

In this way, profiled components with tailored properties can be advantageously produced, for example in dependence on the corresponding processing speed. In particular in the case of profiled components that are used as motor vehicle components, regions of high strength and "soft" regions, which serve for absorbing energy in the event of a crash by crumpling, can be created as a result.

According to a further embodiment, in a first time phase of the press hardening, first subregions of the profiled structural part have tool contact with tool parts of the press-hardening tool and second subregions of the profiled structural part have no tool contact with tool parts of the press-hardening tool in this first time phase of the press hardening. In a second time phase of the press hardening, both the first subregions and the second subregions of the profiled structural part have tool contact with the tool parts of the press-hardening tool. The first subregions of the profiled structural part, which have the first tool contact in the first time phase, are quickly cooled or quenched by the tool contact and consequently have a microstructure with a high strength. The second subregions of the profiled structural part, which only have tool contact in the second time phase, subsequently have a soft, ductile microstructure.

For martensite formation in certain regions of the component, the press or the press-hardening tool may be closed to within a certain distance, first subregions of the profiled structural part, in which there is tool contact, being quenched and imparted with high strengths by microstructural transformation. In this case, the shrinkage of the component or of the profiled structural part as a result of the cooling can be taken into account by a defined closing speed of the press or of the press-hardening tool, so that in particular there is a contact surface between the press-hardening tool and the component or the profiled structural part that is always constant.

For creating a number of different microstructures, in particular different strengths or ductilities, in the profiled structural part, the press or the press-hardening tool may be closed until the surface of the tool touches the surface of the profile in which a martensitic state is to be achieved. After a defined time period, the press-hardening tool may be closed beyond the shrinkage allowance, so that the profiled structural part is deformed and a further surface or a further subregion cools down. As a result, a different material property, particular different strength or ductility, can be achieved for the further subregion.

According to a further embodiment, the press-hardening tool is not completely closed during the press hardening. For example one or more spacers that prevent complete closing of the press-hardening tool may be provided between two tool parts of the press-hardening tool. As a result, it can be achieved for example that, in a state of the press-hardening tool in which it is closed to the maximum, certain subregions of the profiled structural part have no tool contact, so that these subregions have a lower strength or higher ductility after the press hardening.

According to a further embodiment, the press-hardening tool has at least four tool parts in relation to which the profiled structural part has tool contact during the press hardening. The fact that the press-hardening tool has at least four tool parts or tool segments means that it is possible in a particularly easy way to control which subregions of the profiled structural part are to have tool contact at which time, so that a specific setting of the material properties of the individual subregions can be achieved. For example, the press-hardening tool may have six tool parts or tool segments in relation to which the profiled structural part has tool contact during the press hardening, i.e. at at least one time during the press hardening.

According to a further embodiment, at least one tool part of the press-hardening tool is locally heated during the press hardening. For example, a heating device, which may for example be formed as a heating cartridge, may be provided in at least one tool part. With the heating device or heating cartridge, it can be achieved during the press hardening that a neighboring subregion of the profiled structural part is cooled more slowly than other subregions, so that this subregion of the profiled structural part has a higher ductility after the press hardening. Furthermore, each tool part of the press-hardening tool may have at least one heating device or heating cartridge. In addition, it is also conceivable that at least one tool part of the press-hardening tool or a number of the tool parts or even all of the tool parts of the press-hardening tool have a plurality of heating devices or heating cartridges.

According to a further embodiment, the profiled structural part comprises a manganese-boron steel. For example, the profiled structural part may have a main body of 22MnB5 or of 20MnB8.

According to a further embodiment, the profiled structural part has a zinc coating. The profiled structural part may for example be produced from a tubular, galvanized steel body or from a galvanized steel tube.

According to a further embodiment, the profiled structural part is preformed by a hydroforming process before the heat treatment step. For producing the profiled structural part, it may be for example that a galvanized steel tube is bent into a desired form and, to achieve complex component geometries, is subsequently formed further by hydroforming. In addition or as an alternative to the hydroforming, the profiled structural part may be worked by a laser process and/or stamping process before the heating or heat treatment.

According to a further embodiment, a surface treatment or conditioning takes place after the press hardening of the profiled structural part. Furthermore, a laser processing of the profiled structural part is possible.

Also provided is a profiled component that is produced by a method described here. The profiled component is preferably formed as motor vehicle component. In particular, the profiled component may be a body component for a motor vehicle. The profiled component that can be produced or is produced by the described method may have one or more of the features mentioned in connection with the method described. In particular, the profiled component may have a main body of steel, such as for example of 22MnB5 or of 20MnB8, and be provided with a zinc coating.

A profiled component described here, formed as a motor vehicle component, allows an increase in passive safety in innovative vehicle concepts and a weight reduction to be achieved, along with high stiffness performance and also great freedoms of design.

Other objects, advantages and novel features of the present invention will become apparent from the following detailed description of one or more preferred embodiments when considered in conjunction with the accompanying drawings.

DETAILED DESCRIPTION OF THE DRAWINGS

In the exemplary embodiments and figures, elements that are the same or act in the same way may be provided in each case with the same designations. The depicted elements and their sizes in relation to one another are in principle not to be regarded as true to scale. Rather, individual elements may be illustrated with exaggerated thickness or size dimensions for improved clarity and/or for improved understanding.

Figure 1:
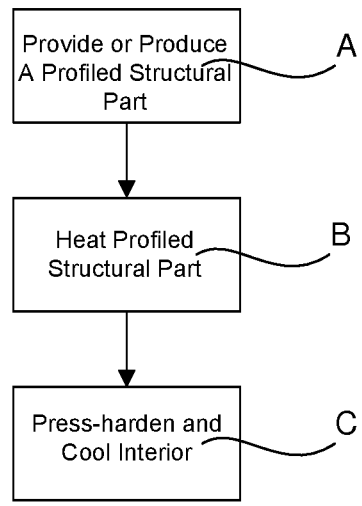
FIG. 1 is a schematic representation of a method for producing a profiled component according to an exemplary embodiment.

In FIG. 1, a schematic representation of a method for producing a profiled component is shown. In the method, a profiled structural part 2 is provided or produced in a method step A. The profiled structural part 2 may be for example a steel tube with a zinc coating.

After that, in a further method step B, the profiled structural part 2 is heated, for example to a temperature of between 850° C. and 907° C.

In a then-following method step C, the profiled structural part 2 is press-hardened in a press-hardening tool 1, the profiled structural part 2 in the press-hardening tool 1 being cooled in the interior of the profiled structural part 2 by circulating air or ambient air.

Figure 2:
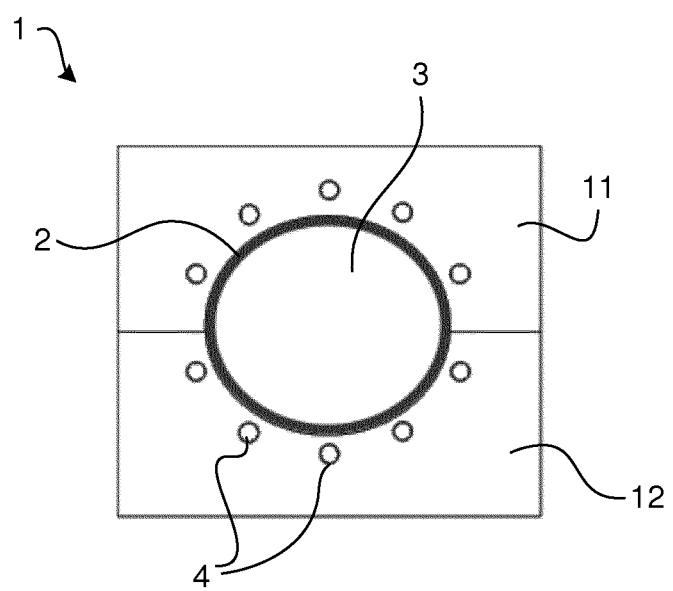
FIG. 2 is a schematic representation of a profiled component arranged in a press-hardening tool to illustrate a method step of the method according to a further exemplary embodiment.

In FIG. 2, method step C according to one exemplary embodiment is shown in a schematic representation, the profiled structural part 2 being arranged in the press-hardening tool 1, which has a first tool part 11 and a second tool part 12. The first tool part 11 and the second tool part 12 have in each case a plurality of cooling channels 4, through which a cooling medium, such as for example water, can flow, so that the profiled structural part 2 arranged in the press-hardening tool 1 can be cooled indirectly. In the interior 3 of the profiled structural part 2, the surface of the profiled structural part 2 bordering the interior 3 is cooled by circulating air or ambient air. The circulating air or ambient air directed into the interior 2 may, for example, have a temperature of between 15° C. and 25° C.

Figure 3A:
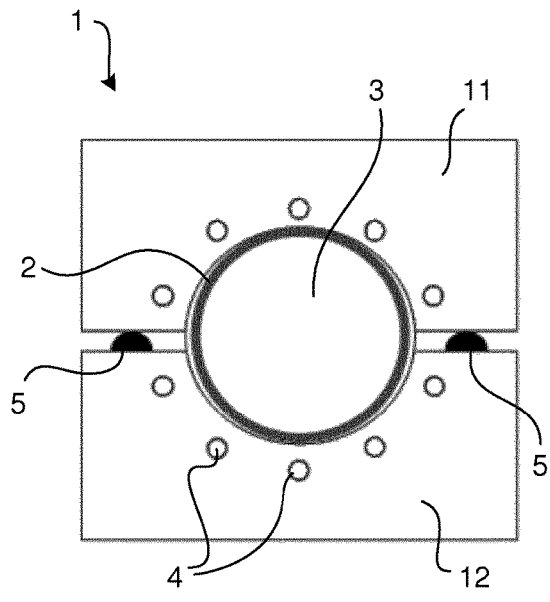
FIGS. 3A to 5 are schematic representations of the method for producing a profiled component according to further exemplary embodiments.
Figure 3B:
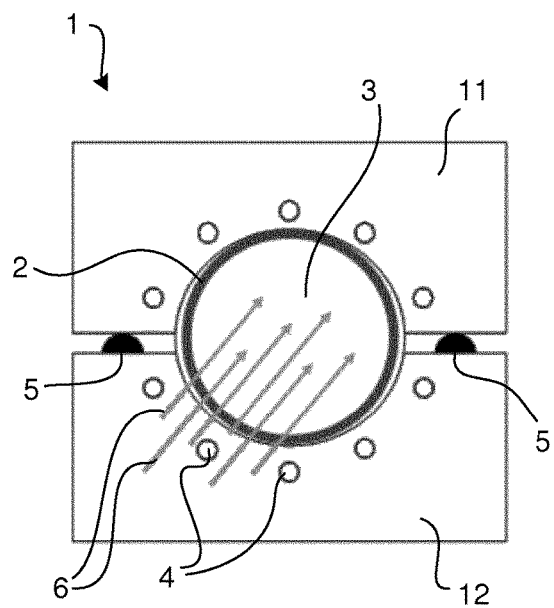
Figure 3C:
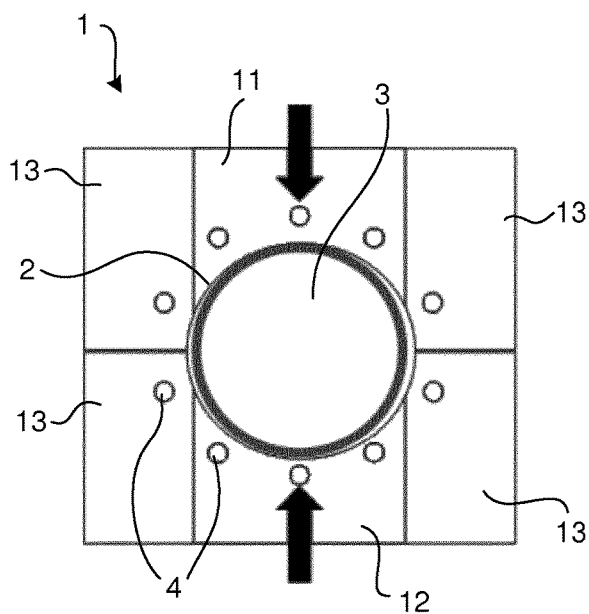
Figure 3D:
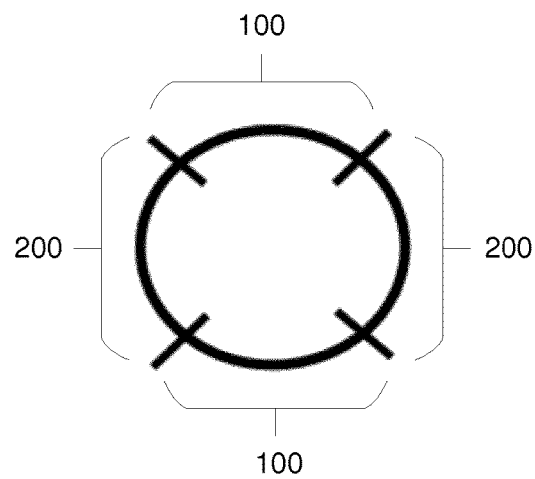

FIGS. 3A to 3C respectively show a profiled structural part 2, which is arranged in a press-hardening tool 1, according to various exemplary embodiments. These exemplary embodiments have in common that profiled structural parts 2 or profiled components which each have subregions with different material properties are obtained after the press hardening. As depicted in FIG. 3D, the profiled components may for example have subregions 100, which are formed hard and have a high strength, and also subregions 200, which are formed soft and have a high ductility.

As a difference from the press-hardening tool according to FIG. 2, the press-hardening tool 1 of FIG. 3A has spacers 5, which prevent the press-hardening tool 1 or the tool parts 11, 12 from closing completely. As a result, subregions 200 of the profiled structural part 2 have no tool contact, whereby delayed cooling takes place in these regions, which has the consequence that these regions have a lower strength in the finished profiled component.

In the exemplary embodiment according to FIG. 3B, circulating air is directed into the interior 3 of the profiled structural part 2 by means of a stream of compressed air or a stream of driving air.

FIG. 3C shows a press-hardening tool 1 which has altogether six tool parts 11, 12, 13, two of which in each case are assigned to one another and can be moved in relation to one another. The fact that the press-hardening tool has six tool parts 11, 12, 13 means that it is possible in a particularly easy way to control which subregions of the profiled structural part 2 have tool contact at which time, so that a specific setting of the material properties of the individual subregions can be achieved.

Figure 4A:
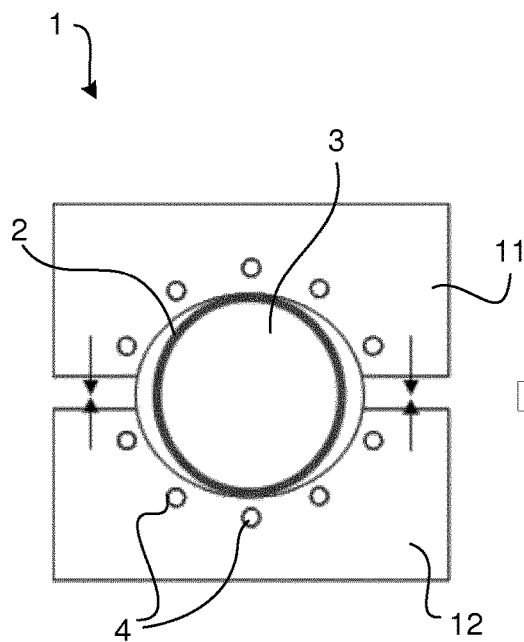
Figure 4B:
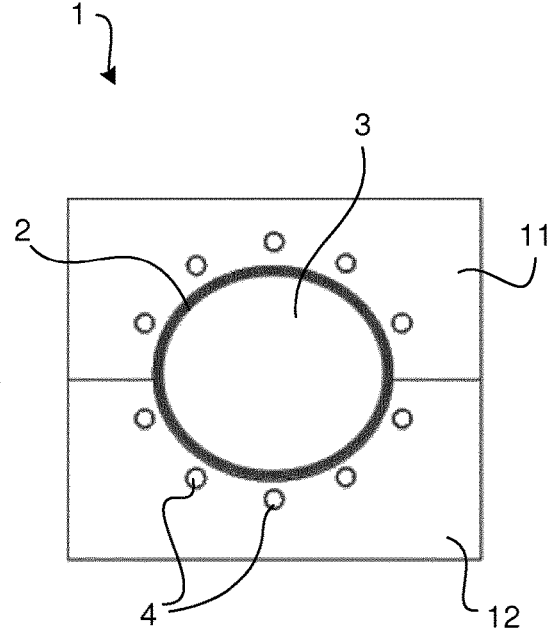

In FIGS. 4A and 4B, a further exemplary embodiment is shown of a method for producing a profiled component in which so-called tailored properties are achieved by clamping and squeezing. Subregions of the profiled structural part 2 that have tool contact with the first tool part 11 or the second tool part 12 at a first time are quickly quenched, whereby the subregions are given a microstructure with high strength. By contrast, subregions of the profiled structural part 2 that undergo tool contact at a later time have a higher ductility in the finished profiled component.

Figure 5:
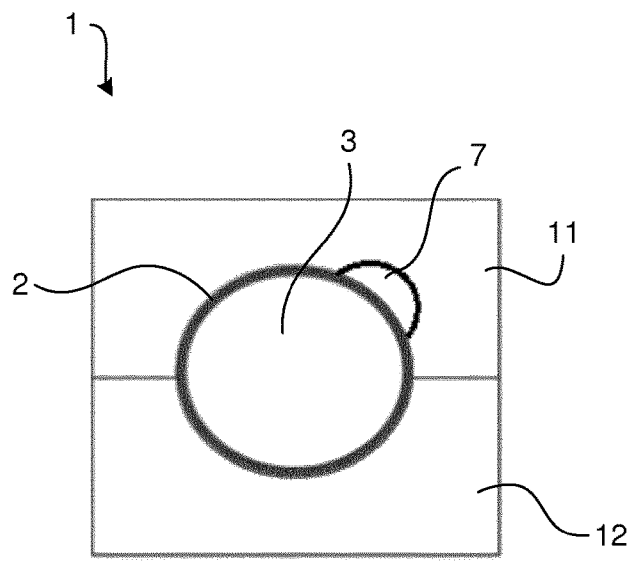

FIG. 5 shows a profiled structural part 2 according to a further exemplary embodiment arranged in a press-hardening tool 1, a first tool part 11 of the press-hardening tool 1 having a heating device or heating cartridge 7, by which a hardening speed can be slowed or prevented in a locally confined, neighboring region of the profiled structural part 2, so that the profiled structural part 2 or the finished profiled component subsequently has in this region a low hardness and low strength and also a high ductility.

LIST OF REFERENCE SIGNS

1 Press-hardening tool
2 Profiled structural part
3 Inner region
4 Cooling channel
5 Spacer
6 Stream of compressed air
7 Heating device
11 First tool part
12 Second tool part
13 Further tool part
100, 200 Region of the profiled structural part
A, B, C Method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a profiled component, comprising:
   providing and/or producing a profiled structural part;
   heat treating the profiled structural part; and
   press hardening the profiled structural part in a press-hardening tool,
   wherein, during a cooling phase of the press hardening of the profiled structural part:
      in a first time phase of the cooling, placing the press-hardening tool into a first physical configuration such that at least one first subregion of the profiled structural part has tool contact with tool parts of the press-hardening tool and is cooled and/or quenched by the tool parts, and at least one second subregion of the profiled structural part has no tool contact with tool parts of the press-hardening tool, and in a second time phase of the cooling following the first time phase, moving at least a portion of the press-hardening tool into a second physical configuration such that the at least one first subregion and the at least one second subregion both have tool contact with the tool parts of the press-hardening tool and are both cooled and/or quenched by the tool parts, wherein the profiled structural part in the press-hardening tool is cooled in an interior thereof by circulating air, and wherein during the cooling phase, different material properties are set in the at least one first subregion and the at least one second subregion.

2. The method according to claim 1, wherein ambient air is directed into the interior of the profiled structural part as the circulating air.

3. The method according to claim 2, wherein
the ambient air directed into the interior of the profiled structural part has a temperature of between 10° C. and 30° C.

4. The method according to claim 2, wherein
the ambient air directed into the interior of the profiled structural part has a temperature of between 15° C. and 25° C.

5. The method according to claim 1, wherein
the profiled structural part arranged in the press-hardening tool is also cooled from an outside by indirect cooling.

6. The method according to claim 1, wherein
the different material properties include different strengths.

7. The method according to claim 1, wherein
the specific setting of the different material properties is achieved by controlling a closing operation of the press-hardening tool via controlling the position of the at least one portion of the press-hardening tool.

8. The method according to claim 1, wherein
the press-hardening tool is at least partially open during the press hardening.

9. The method according to claim 1, wherein
the press-hardening tool has at least four tool parts that are distinct bodies, wherein each tool part of the at least four tool parts is configured to contact the profiled structural part during the press hardening.

10. The method according to claim 9, wherein
at least one tool part of the press-hardening tool is heated during the press hardening.

11. The method according to claim 1, wherein
the press-hardening tool includes a plurality of tool parts, wherein
at least one tool part of the press-hardening tool is heated during the press hardening.

12. The method according to claim 1, wherein
the profiled structural part is preformed by a hydroforming process before the heat treating.

13. The method according to claim 1, wherein
the profiled structural part has a zinc coating.

* * * * *